UNITED STATES PATENT OFFICE.

LUDWIG GROTE, OF LANDBERG-ON-THE-LECH, GERMANY.

ARTIFICIAL STONE.

SPECIFICATION forming part of Letters Patent No. 521,264, dated June 12, 1894.

Application filed November 22, 1893. Serial No. 491,678. (No specimens.) Patented in England September 12, 1893, No. 17,142.

*To all whom it may concern:*

Be it known that I, LUDWIG GROTE, manager, a subject of the German Emperor, residing at Landberg-on-the-Lech, in the German Empire, have invented certain new and useful Improvements in the Manufacture of Artificial Stone, Preservative Paint, and other Analogous Materials, (for which I have obtained a patent in Great Britain, No. 17,142, bearing date September 12, 1893,) of which the following is a specification.

The object of my invention is to effect further improvements in the manufacture of artificial stone and the like, described in my former Letters Patent dated December 1, 1891, No. 464,120; and to extend the application of such invention to the formation of protective layers for stone and other materials, and rendering the same capable of withstanding the action of the atmosphere.

In carrying out my invention, I use combinations of chloride of magnesium, acetate of lead, calcined magnesite, plumbate of lime, and water; to which are added filling materials, such as "slag wool," sand, gravel, clay, and other earthy or mineral matter; also wood, wood pulp, shavings of wood, saw-dust, paper, vegetable and mineral fibers, and analogous materials, waste or otherwise and with or without any previous preparation.

In this specification the word "magnesite" is in all cases to be read and understood as meaning "magnesite freed from carbonic acid," such as is left as a by-product in the process of manufacture of carbonic acid from magnesite stone.

The following are examples, showing some of the materials and the proportions (or thereabout) in which such materials are mixed and combined in the processes and manufactures herein before referred to.

In the manufacture of building stone, I use:

| | |
|---|---:|
| Chloride of magnesium 35°............ | 8.87 |
| Acetate of lead (diluted in).......... | 0.58 |
| Water...................... | 1.75 |
| Calcined magnesite................ | 6.00 |
| Sand, gravel, or earthy matter....... | 82.80 |
| | 100.00 |

In the manufacture of what I term fibrous-stone, having less hardness than the foregoing, I use:

| | |
|---|---:|
| Chloride of magnesium 35°........... | 38.0 |
| Acetate of lead (diluted in)........... | 2.5 |
| Water............................ | 14.7 |
| Saw-dust, paper, or wood pulp........ | 18.0 |
| Clay or other earthy matter.......... | 6.8 |
| Calcined magnesite................. | 20.0 |
| | 100.0 |

In the manufacture of caustic stone, I use:

| | |
|---|---:|
| Chloride of magnesium 35°........... | 10.8 |
| Plumbate of lime................... | 0.6 |
| Acetate of lead (diluted in).......... | 0.7 |
| Water............................ | 2.2 |
| Oils or fats........................ | 1.7 |
| Calcined magnesite................. | 12.3 |
| Sand, gravel, or earthy matter........ | 71.7 |
| | 100.0 |

In the manufacture of material for casting in a fluid state, to form stone, I use:

| | |
|---|---:|
| Chloride of magnesium 38°........... | 24.0 |
| Acetate of lead (diluted in) .......... | 1.7 |
| Water............................ | 4.7 |
| Calcined magnesite................. | 24.6 |
| Dry sand ......................... | 45.0 |
| | 100.0 |

In the manufacture of plaster or paint or analogous material, to form a coating or enamel for preserving other materials, I use:

| | |
|---|---:|
| Chloride of magnesium 35°........... | 40.0 |
| Acetate of lead (diluted in) .......... | 2.5 |
| Water............................ | 7.5 |
| Plumbate of lime, baryta, or barium or strontia......................... | 10.0 |
| Calcined magnesite................. | 40.0 |
| | 100.0 |

The foregoing combinations of materials may be colored or marbled by means of any suitable coloring matter added thereto as required.

The liquid or fluid mixture used as a paint may be diluted with oil or varnish. The addition of cement to the plate delays its setting; the greater the proportion of cement, the longer it can be preserved in a liquid state.

In plastic mixtures for shaping or molding, as well as in mixtures for casting, and for liquid paints, the calcined magnesite may be dispensed with, and corresponding quantities of serpentine kaolin, china-clay, chalk, pulverized oyster shells or zinc and lead oxide may be substituted therefor; also a solution of hydro-chloric acid or zinc chloride may be used instead of the chloride of magnesium but these substituted materials do not give such a good result as the former.

The term "caustic stone" heretofore used signifies an artificial stone in the manufacture of which are incorporated oils, fats and other oleaginous substances which can only be effected by the addition of plumbate of lime, or other caustifying ingredient.

The following are some of the advantages attending the use of my invention:

First. The stone is not porous, and therefore does not absorb moisture.

Second. Changes of temperature do not affect the stone, nor is it injured by sulphuric or other vapor from smoke or fog.

Third. The chemicals kill the salts contained in earthy matters, and render such salts neutral. It is well known that sea-sand is unfit for use in the building trade, but the chemicals in my invention kill the salt in the sea-sand, and render it suitable for manufacturing clean artificial sand-stone.

Fourth. Cement and other binding materials at present in use, will only bind sand and the like; but my chemicals will bind all ordinary materials, and thereby form artificial stone as hard as granite.

Fifth. The water added to the mass is absorbed as water of crystallization by the chemicals, and therefore does not evaporate as with ordinary cement. The composition formed by the chemical reaction incloses every particle of filling matter, and protects it from the air.

Sixth. The addition of acetate of lead has the effect of rendering the stone impervious to moisture.

Seventh. Resins, asphalt, and oily substances render the stone suitable for insulating purposes, and also impart a less unyielding character thereto; caustifying ingredients, such as plumbate of lime, strontia, baryta or barium or soda or other caustifying materials are however required for chemically combining the mass, when resins, asphalt and oily substances are used as above mentioned.

Eighth. The addition of wood-pulp, saw-dust, fibers and the like render the stone sufficiently soft or resilient to enable it to be turned and worked like wood during the first four days, and before the hardness has attained its full development, its resiliency however remains after the hardness has been attained.

Ninth. Ordinary artificial stone needs to be immersed in chemicals, or in water, to kill the salt and render it capable of withstanding atmospheric influences. The effect is superficial and imperfect in its result; as, in case the stone should crack, water can penetrate and exercise a destructive effect. My stone, on the contrary, is homogeneous and indestructible.

Tenth. No pressure is required to consolidate the stone.

Eleventh. My combination of chemicals will bind up to the proportion of one to thirteen; that is to say, one pound of chemicals will bind thirteen pounds of sand and gravel into a good concrete stone, equal to cement in the proportion of one of water to six of cement.

Having now particularly described and ascertained the nature of my said invention and in what manner the same is to be performed, I declare that what I claim is—

1. A composition of matter for making artificial stone, consisting of chloride of magnesium, acetate of lead diluted in water, calcined magnesite, and a filling material, such as sand, gravel, saw-dust, clay, paper, wood-pulp, or earthy matter, substantially as set forth.

2. A composition of matter for making artificial stone, &c., consisting of chloride of magnesium, acetate of lead diluted in water, a caustifying ingredient such as plumbate of lime, calcined magnesite, an oleaginous substance, and a filling material such as sand, gravel, or earthy matter, substantially as set forth.

Dated this 8th day of November, 1893.

LUDWIG GROTE.

Witnesses:
GEORGE C. DOWNING,
    8 *Quality Court, London, W. C.*
THOMAS LAKE,
    17 *Gracechurch Street, London.*